US008000527B2

(12) United States Patent
Grady et al.

(10) Patent No.: US 8,000,527 B2
(45) Date of Patent: Aug. 16, 2011

(54) INTERACTIVE IMAGE SEGMENTATION BY PRECOMPUTATION

(75) Inventors: Leo Grady, Yardley, PA (US); Ali Kemal Sinop, Pittsburgh, PA (US)

(73) Assignee: Siemens Aktiengesellschaft, München ( * ) Notice: Subject to any disclaimer, the term of this patent is extended or adjusted under 35 U.S.C. 154(b) by 923 days.

(21) Appl. No.: 11/949,832

(22) Filed: Dec. 4, 2007

(65) Prior Publication Data

US 2008/0260247 A1 Oct. 23, 2008

Related U.S. Application Data

(60) Provisional application No. 60/912,245, filed on Apr. 17, 2007.

(51) Int. Cl.
*G06K 9/34* (2006.01)

(52) U.S. Cl. ........ 382/173; 382/164; 382/171; 382/175; 382/190; 382/199

(58) Field of Classification Search .................. 382/173, 382/164, 171, 175, 190, 199, 181
See application file for complete search history.

(56) References Cited

U.S. PATENT DOCUMENTS

| 2006/0029275 | A1* | 2/2006 | Li et al. | 382/173 |
| 2007/0165966 | A1* | 7/2007 | Weiss et al. | 382/284 |
| 2007/0168154 | A1* | 7/2007 | Ericson | 702/179 |
| 2008/0212899 | A1* | 9/2008 | Gokturk et al. | 382/305 |

OTHER PUBLICATIONS

Y. Boykov and M.-P. Jolly. Interactive graph cuts for optimal boundary & region segmentation of objects in N-D images. In Proc. of ICCV 2001, pp. 105-112, 2001.
T. F. Chan, J. R. Gilbert, and S.-H. Teng. Geometric spectral partitioning. Technical Report CSL-94-15, Palo Alto Research Center, Xerox Corporation, 1994.
A. K. Chandra, P. Raghavan, W. L. Ruzzo, R. Smolensky, and P. Tiwari. The electrical resistance of a graph captures its commute and cover times. Computational Complexity, 6(4):312-340, 1996.
C. Fowlkes, S. Belongie, F. Chung, and J. Malik. Spectral grouping using the Nystrom method. IEEE PAMI, 26(2):214-225, Feb. 2004.
L. Grady. Random walks for image segmentation. IEEE Trans. on Pat. Anal. and Mach. Int., 28(11):1768-1783, Nov. 2006.
L. Lovasz. Random walks on graphs: A survey, Combinatorics, Paul Erdos is Eighty, vol. 2, pp. 353-398. Janos Bolyai Math. Soc., 1996.
H. Qiu and E. R. Hancock. Image segmentation using commute times. In 16th British Mach. Vis. Conf. (BMVC 2005), pp. 929-938, 2005.
M. Saerens, F. Fouss, L. Yen, and P. Dupont. The principal component analysis of a graph and its relationships to spectral clustering. In Proc. of the 15th Eur. Conf. on Mach. Learn. (ECML 2004), vol. 3201 of LNCS, pp. 371-383, 2004.
J. Shi and J. Malik. Normalized cuts and image segmentation. IEEE Trans. on Pat. Anal. and Mach. Int., 22(8):888-905, Aug. 2000.
L. Yen, D. Vanvyve, F. Wouters, F. Fouss, M. Verleysen, and M. Saerens. Clustering using a random walker based distance measure. In Proc. of the 13th Symp. on Art. Neur. Net. (ESANN 2005), pp. 317-324, 2005.

* cited by examiner

*Primary Examiner* — Samir A Ahmed
*Assistant Examiner* — Ali Bayat
(74) *Attorney, Agent, or Firm* — Donald B. Paschburg; F. Chau & Associates, LLC

(57) ABSTRACT

A method for interactive image segmentation includes receiving an image to be segmented, performing an offline computation of eigenvectors of a Laplacian of the image without using seed points, receiving seed points, and performing an online segmentation taking the seed points and the eigenvectors of the Laplacian as input and outputting a partition of the image.

5 Claims, 3 Drawing Sheets

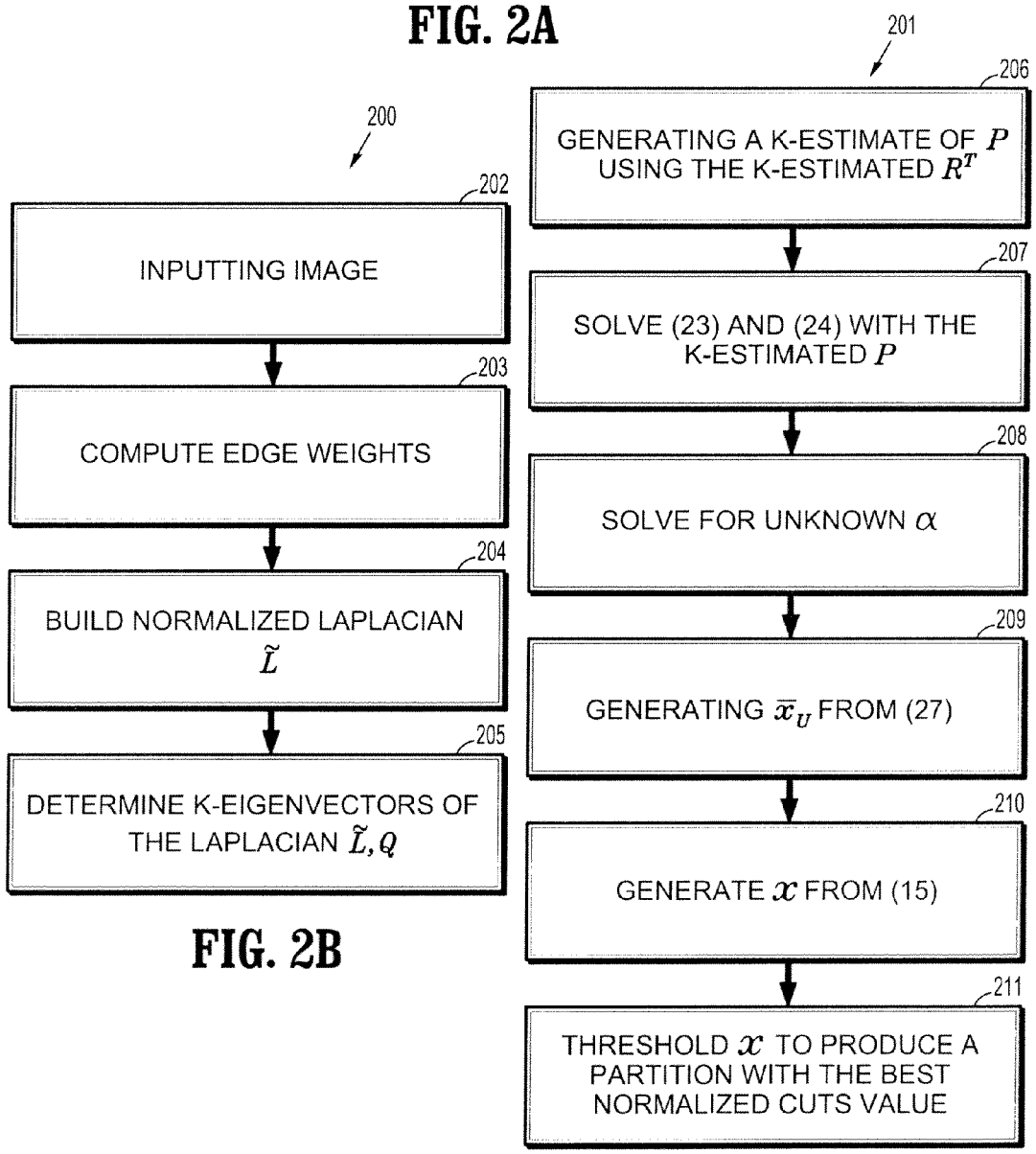

INTERACTIVE IMAGE SEGMENTATION BY PRECOMPUTATION

CROSS-REFERENCE TO RELATED APPLICATION

This application claims priority to U.S. Provisional Application Ser. No. 60/912,245, filed on Apr. 17, 2007, which is herein incorporated by reference in their entirety.

BACKGROUND OF THE INVENTION

1. Technical Field

The present invention relates to image processing, and more particularly to a system and method for interactive image segmentation based on seed points and predetermined eigenvectors.

2. Discussion of Related Art

Methods for providing an interactive image segmentation algorithm take user placed seeds as input to distinguish foreground and background regions. The Random Walker method is an exemplary approach to this problem. For large 3D volumes, the computation time of the Random Walker algorithm is prohibitively slow.

Therefore, a need exists for a system and method for segmentation via precomputation.

SUMMARY OF THE INVENTION

According to an embodiment of the present disclosure, a method for image segmentation includes receiving an image to be segmented, and processing the image, the processing comprising a non-interactive portion outputting inputs for an interactive segmentation portion acting on seed points on the image to output a partition of the image.

According to an embodiment of the present disclosure, a method for interactive image segmentation includes receiving an image to be segmented, performing an offline computation of eigenvectors of a Laplacian of the image without using seed points, receiving seed points, and performing an online segmentation taking the seed points and the eigenvectors of the Laplacian as input and outputting a partition of the image.

BRIEF DESCRIPTION OF THE DRAWINGS

Preferred embodiments of the present invention will be described below in more detail, with reference to the accompanying drawings:

FIGS. 2A-C are flow diagrams of a method for segmentation according to an embodiment of the present disclosure.

DETAILED DESCRIPTION OF EXEMPLARY EMBODIMENTS

Figure 1C:
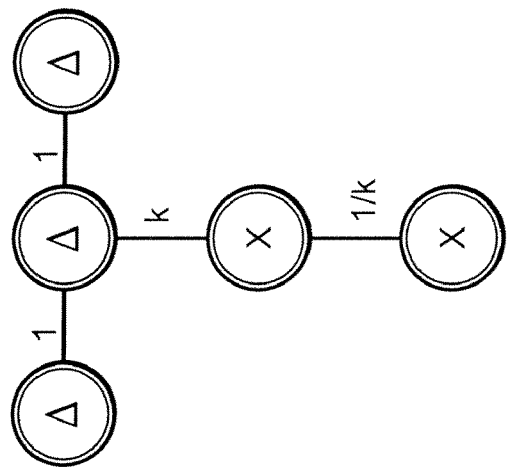
FIGS. 1A-C are illustrations of exemplary approaches to assigning a segmentation given seed points.

A method for interactive image segmentation given user-placed seeds to distinguish a foreground and background region. In this method, the majority of the computation may be performed before the seeds are placed by the user. Consequently, the "online" segmentation is both high quality and extremely fast.

The interactive image segmentation allows a user to acquire an object of interest from a 2D or 3D image. An interactive algorithm according to an embodiment of the present disclosure allows a user to specify which object is desired to be extracted, allows the user to correct an erroneous segmentation by continuing the user interaction, and reduce the time between user interaction and segmentation return.

According to an embodiment of the present disclosure, a method for interactive image segmentation produces a segmentation based on user interaction and editing from a Random Walker image segmentation. A precomputation ("offline") procedure is performed without user inputted seed points, the precomputation improves the time that the user has to wait between interaction and the production of a segmentation ("online" time). By performing the precomputation, the segmentations obtained by the Random Walker algorithm are accurately estimated. Additionally, the image segmentation method may be interpreted as an interactive version of the Normalized Cuts segmentation method.

Referring to the notation used herein: A graph comprises a pair $G=(V,E)$ with vertices (nodes) $v \in V$ and edges $e \in E \subseteq V \times V$, with $N=|V|$ and $M=|E|$. An edge, e, spanning two vertices, $v_i$ and $v_j$, is denoted by $e_{ij}$. A weighted graph assigns a value to each edge called a weight. The weight of an edge, $e_{ij}$, is denoted by $w(e_{ij})$ or $w_{ij}$ and is assumed here to be nonnegative. The degree of a vertex is $d_i = \Sigma w(e_{ij})$ for all edges $e_{ij}$ incident on $v_i$. The following will also assume that a graph is connected and undirected (i.e., $w_{ij}=w_{ji}$). An image may be associated with a graph by identifying each pixel with a node and defining an edge set to represent the local neighborhood relationship of the pixels.

The (relaxed) Normalized Cut method finds a two-way partition of a graph by thresholding the second smallest generalized eigenvector associated with the problem $$Ly = \lambda Dy \qquad (1)$$

where y is the generalized eigenvector associating one value with each node, $\lambda$ is the eigenvalue, D is a diagonal matrix such that $D(i,i)=d_i$ and L represents the Laplacian matrix defined as $$L(i,j) = \begin{cases} d_i & \text{if } i = j, \\ -\omega_{ij} & \text{if } v_i \text{ and } v_j \text{ are adjacent nodes}, \\ 0 & \text{otherwise}, \end{cases} \qquad (2)$$

where $L(i,j)$ is indexed by vertices $v_i$ and $v_j$.

Although the Normalized Cut method employs only a single (generalized) eigenvector to bipartition a graph (corresponding to the smallest nonzero eigenvalue), a K-means algorithm may be employed in the coordinate space defined by the "coordinates" assigned to each node in successive eigenvectors. Such coordinates may be referred to as spectral coordinates and may be used for clustering. According to an embodiment of the present disclosure, the spectral coordinates are used to define a distance measure, from which the distance from each node to the seeds may be computed and then partitioned accordingly to which seed has shorter distance.

Here the computation of the eigenvectors may be done offline without any knowledge of where the user will place seeds. Therefore, during "use time," the method is fast for even large images/volumes.

Referring to the single seed case; the case in which a single "foreground" node, $v_F$, and "background" node, $v_B$, are designated as seeds, a desired partition may be defined as Foreground=$\{v_i|\text{dist}(v_i,v_F)<\text{dist}(v_i,v_B)\}$, Background=$\{v_i|\text{dist}(v_i,v_B)\geq\text{dist}(v_i,v_F)\}$, (3)

where $$\text{dist}(v_i,v_j)=r_{ij}^T Y\Lambda^{-1}Y^T r_{ij}, \quad (4)$$

Y is the matrix of all generalized eigenvectors, taking column i as $y_i$, $\Lambda^{-1}$ is a diagonal matrix with $\Lambda(i,i)=1/\lambda_i$ and $r_{ij}$ is an indicator vector taking values $$r_{ij}(k) = \begin{cases} 1 & \text{if } i = k, \\ -1 & \text{if } j = k, \\ 0 & \text{otherwise.} \end{cases} \quad (5)$$

Note that the eigenvalues, $\lambda_i$, is indexed in increasing order, i.e., $\lambda_1=0<\lambda_2\leq\lambda_3\leq\ldots\leq\lambda_{N-1}$. The first eigenvalue is identically zero and, therefore, in the definition of distance (4) it is assumed that $\Lambda^{-1}(1,1)=0$.

The inclusion of $\Lambda^{-1}$ in the definition of distance (4) may be unexpected—clustering of the spectral coordinates of the nodes may be performed without weighting the spectral coordinates with their corresponding eigenvalues. $\Lambda^{-1}$ is included because it makes the distance easier to approximate by calculating only the first few eigenvectors and because the definition of (4) allows interpretation as equivalent to the effective resistance (viewing the graph as a linear circuit where weights are equivalent to conductances) between two nodes. The effective resistance is also proportional to the commuting time of a random walk on the weighted graph from node $v_i$ to $v_j$. The commuting time measures the expected number of steps that a random walker would take to pass from node $v_i$ to $v_j$ and then back again from $v_j$ to $v_i$. The commuting time has become a popular quantity for graph embedding (dimensionality reduction), graph matching and unsupervised clustering.

To see the connection between the definition of (4) and commuting time, define the normalized Laplacian matrix as $$\tilde{L} = D^{-\frac{1}{2}}LD^{-\frac{1}{2}}, \quad (6)$$

with corresponding eigenvector decomposition $$\tilde{L}=Q\Lambda Q^T. \quad (7)$$

The eigenvectors, Q, are related to the generalized eigenvectors described by (1)

$$Y = D^{-\frac{1}{2}}Q. \quad (8)$$

Therefore, (4) may be rewritten in terms of the eigenvectors of $\tilde{L}$ as $$\text{dist}(v_i, v_j) = r_{ij}^T D^{-\frac{1}{2}} Q\Lambda^{-1} Q^T D^{-\frac{1}{2}} r_{ij} \quad (9)$$

$$= \sum_{k=2}^{N}\frac{1}{\lambda_k}\left(\frac{q_{ik}}{\sqrt{d_i}} - \frac{q_{jk}}{\sqrt{d_j}}\right)^2,$$

which equals the effective resistance between two nodes and is proportional to the commuting time between $v_i$ and $v_j$.

By computing and storing only K-eigenvectors of $\tilde{L}$, a K-approximation of the distance between $v_i$ and $v_j$ may be formed as $$\text{dist}_K(v_i, v_j) = \sum_{k=2}^{N}\frac{1}{\lambda_k}\left(\frac{q_{ik}}{\sqrt{d_i}} - \frac{q_{jk}}{\sqrt{d_j}}\right)^2. \quad (10)$$

By employing a K-approximation of the distance function and precomputing the eigenvectors, the "online" segmentation may be computed in low-constant linear time whenever a user places the seeds.

By using the eigenvalue weighted distance in the space defined by the spectral coordinates of the generalized eigenvectors used by Normalized Cuts, a partitioning method is defined that assigns nodes to the foreground/background partition depending on whether or not the node has a smaller distance with the foreground/background seed. The method as written above applies to the case in which the user has placed a single foreground seed and a single background seed.

Referring to the construction with multiple seeds; in order to address the case of multiple seeds, separate the node set into three nonintersecting sets $V_F$, $V_B$ and $V_U$, such that VF contains all seed nodes labeled foreground, $V_B$ contains all seed nodes labeled background, $V_U$ contains all the unseeded nodes and $V_F \cup V_B \cup V_U = V$. Two exemplary approaches for extending a method to multiple foreground/background seeds are described. A first approach is to assign the node, $v_i \in V_U$, to foreground (background) if the distance between the node is smaller to a foreground (background) seed than to any background (foreground) seed, i.e., Foreground=$\{v_i|\exists v_f \in V_F$ s.t. $\text{dist}(v_i,v_f)<\text{dist}(v_i,v_b) \forall v_b \in V_B\}$. A second approach is to assign the unseeded node to foreground if the average distance between the node and all foreground seeds is smaller than the average distance between the node and all background seeds, i.e., Foreground=$\{v_i|\text{average}(\text{dist}(v_i,v_f))<\text{average}(\text{dist}(v_i,v_b)), \forall v_f \in V_F, v_b \in V_B\}$.

Figure 1B:
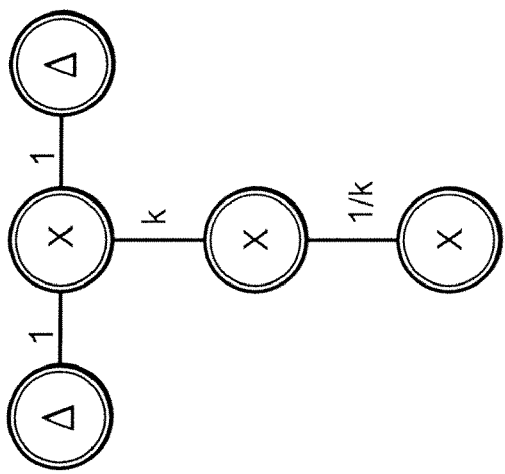
Figure 1A:
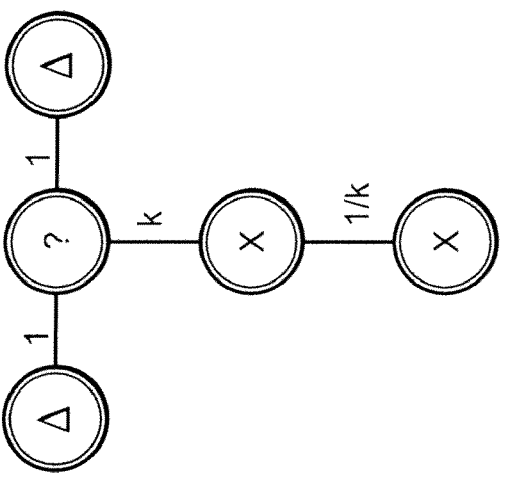

FIGS. 1A-C illustrate exemplary approaches to seeded clustering in spectral coordinates with multiple seeds, including the minimum approach (FIG. 1B) and averaging approach (FIG. 1C). In FIG. 1A, two nodes are seeded with the 'x' label (foreground) and two nodes are seeded with the 'triangle' label. The issue is to decide the label of the node marked with a question mark (the unlabeled node). The edges connecting the unlabeled node to the triangle labels have unit weight, while the edge connecting the unlabeled node to the 'x' label has weight k and the edge connecting the two 'x' labeled nodes has weight 1/k. In FIG. 1B, consider the approach of labeling the unlabeled node by assigning it the label of the closest seed (in spectral space). If $k=1+\epsilon$, then the unlabeled node takes the triangle label, even though this labeling gives a suboptimal Normalized Cuts value of the partition. In FIG. 1C, consider the approach of labeling the unlabeled node by assigning it the label of the seed group with an average spectral coordinate closer to the unlabeled node. If $k=1000$, the unlabeled node is erroneously labeled 'triangle', even though it is strongly connected to an 'x' seed.

The minimum approach produces comparatively poor segmentations because a node might be labeled background if the node has a shorter distance to a single, slightly closer background seed, even if the node has only a slightly more distant relationship with several foreground seeds. This situation is illustrated in FIG. 1B. Even though the unlabeled node is very close to two background seeds, the first approach would assign the node to the foreground because it is $\epsilon$ closer to a single foreground seed. As shown in the FIG. 1B, such a rule would result in a partition with a suboptimal Normalized Cut value. Therefore, it seems that the correct treatment of multiple seeds is to simultaneously take into account all of the foreground/background seeds.

The averaging approach also produces comparatively poor segmentations, but for different reasons. In this approach, the average distances are unduly biased by outlier seeds that are at a great distance (and possibly included by a user to address difficulties in the segmentation in other regions of the image). A succinct example of this problem is given by FIG. 1C. Even though the unlabeled node is nearly equivalent with the foreground seed (due to the near-infinite weight), the presence of a distant foreground seed causes the unlabeled seed to be labeled background. Using this construction the Normalized Cut value of this partition can be made arbitrarily poor for the averaging approach by increasing the value of k.

According to an exemplary approach of the present disclosure, multiple seeds are included by merging all foreground seeds into a single node and background seeds into a single node and applying the procedure for a single seed case to label all unseeded nodes on the new (merged) graph. This exemplary approach overcomes problems with the segmentation behavior, the eigenvectors of the original graph are not the eigenvectors of the merged graph. Here, the eigenvectors may be precomputed "offline," while the "online" segmentation computation may be performed in low-constant linear-time once the user has placed seeds.

A partitioning with respect to a distance measured by effective resistance, (4), may be accomplished by thresholding the solution to the linear system of equations $$L_U x_U = -B x_S, \quad (11)$$

given the set of (foreground and background) seeds, $V_S = V_F \cup V_B$, a function x taking a real value at each node that is unknown on the unseeded set $V_U$ and takes values $x_F = 1$ on the foreground set $V_F$ and $x_B = 0$ on the background set $V_B$. Additionally, in (11) the Laplacian matrix has been decomposed into $$L = \begin{bmatrix} L_S & B \\ B^T & L_U \end{bmatrix}. \quad (12)$$

Note the subscript characters U, S, F and B denote unseeded, seeded, foreground and background, respectively. The superscript T denotes a transpose.

Solving (11) and setting Foreground=$\{x_i | x_U(i) > 0.5\}$ and Background=$\{x_i | x_U(i) \leq 0.5\}$ produces the desired partitions from the single seed case. In the case of multiple foreground/background seeds, setting their $x_S$ values equal is equivalent to forming the merged graph in which all foreground/background seeds are considered to be merged into a single node. In this sense, a seeded Normalized Cuts algorithm is identical to the Random Walker algorithm. The method implements a precomputing of the eigenvectors of $\tilde{L}$ without knowing the location of the seeds and doing a linear-time algorithm to compute the partition once the seeds are given. The eigenvectors of $L_U$ for an arbitrary $V_U$ are not easily derivable from the eigenvectors of $\tilde{L}$.

To establish a potential function that may be thresholded to produce the partitions corresponding to (3) given the precomputed eigenvectors of $\tilde{L}$ and multiple foreground/background seeds, consider that a "reassembled" potential function, $x=[x_S; x_U]$ (using MATLAB notation) may be formed with the property that $$Lx = f = \begin{bmatrix} L_S & B \\ B^T & L_U \end{bmatrix} \begin{bmatrix} x_S \\ x_U \end{bmatrix} = \begin{bmatrix} f_S \\ f_U \end{bmatrix}, \quad (13)$$

where it is clear from (11) that $f_U=0$. In the present context, (13) may be modified to employ the "normalized form", i.e.

$$\tilde{L}\bar{x} = D^{-\frac{1}{2}}f = \bar{f}, \quad (14)$$

where $$\bar{x} = D^{-\frac{1}{2}}x. \quad (15)$$

If $\bar{f}$ was known, the eigenvectors of $\tilde{L}$ may be used to solve (14) by applying the pseudoinverse of $\tilde{L}$, which may be denoted by E, defined as $$E = Q\Lambda^{-1}Q^T, \quad (16)$$

where $\Lambda(1,1)=0$, as above. Application of E to (14) results in $$(I - gg^T)x = E\bar{f} = Q\Lambda^{-1}Q^T\bar{f}, \quad (17)$$

where I is the identity matrix, g is the first eigenvector of $\tilde{L}$, corresponding to the zero eigenvalue. Since $\bar{f}_U=0$, $\bar{f}_S$ is can be calculated, from which $\bar{x}$ can be found. In order to find $\bar{f}$, E is decomposed into $$E = \begin{bmatrix} E_S & R \\ R^T & E_U \end{bmatrix}. \quad (18)$$

From (14) and (17)

$$\tilde{L}_S \bar{x}_S + B \bar{x}_U = \bar{f}_S, \quad (19)$$

$$\bar{x}_U + g_U g_U^T \bar{x}_U = R^T \bar{f}_S, \quad (20)$$

which combine to form $$(I - BR^T)\bar{f}_S = \tilde{L}\bar{x}_S - B g_U g_U^T \bar{x}_U. \quad (21)$$

Let $$P = (I - BR^T). \quad (22)$$

In order to find $\bar{f}_S$, the linear system of equations defined by (21), which is of order |S|, is solved. The unknown $\bar{x}_U$ on the right-hand-side is handled by replacing it with the single unknown $\alpha = g^T \bar{x}_U$. Now, in order to solve (21) for $\bar{f}_S$, decompose $\bar{f}_S = \hat{f} - \alpha \tilde{f}$ and solve $$P\hat{f} = \tilde{L}\bar{x}_S, \quad (23)$$

$$P\tilde{f} = B g_U. \quad (24)$$

Note that $$0 = 1^T D^{\frac{1}{2}} \tilde{L} \bar{x} = 1^T D^{\frac{1}{2}} \bar{f} = 1^T D^{\frac{1}{2}} (\hat{f} - \alpha \tilde{f}), \quad (25)$$

where $1^T$ is taken to represent the vector of all ones. Therefore, the unknown $\alpha$ is solved for by computing $$\alpha = \frac{1^T D_S^{\frac{1}{2}} \hat{f}}{1^T D_S^{\frac{1}{2}} \tilde{f}}. \qquad (26)$$

Given $\tilde{f}_S$, compute $$\bar{x}_U = R^T \tilde{f}_S - \alpha g_U, \qquad (27)$$

from which $x_U$ may be computed (via (15)) and thresholded at 0.5 in order to produce the partitions described by (3).

Referring to the approximation to the multiple seed case; In practice, to precompute only a few eigenvectors of $\tilde{L}$ and work instead with the approximate distances defined by (10), an approximate version of the above procedure may be generated by noting that $$R^T = Q_U \Lambda^{-1} Q_S, \qquad (28)$$

which may be K-approximated by using only K eigenvectors and eigenvalues. By employing the K-approximated $R^T$ in (21), a K-approximated $R^T$ is obtained that ultimately produces a K-approximated x. By experience, an approximation of x may be obtained for even a small K (this point is further expanded in Section 3). However, even a small error in the computation of α can lead to an inaccurate post-thresholded segmentation. Therefore, the threshold of x may be chosen that produces the partition with the best Normalized Cuts value. Note that, depending on the number of eigenvectors used in the approximation, it may be possible that the thresholded segmentation results in a small number of nodes disconnected from their respective seeds. In these cases, a connected component procedure could be employed.

Referring to FIG. 2A, a method includes an "offline" algorithm that has no knowledge of the seeds that the user will use to segment an object 200, and an "online" algorithm that inputs seeds from a user and finds the segmentation 201.

Referring to FIG. 2B, the "offline" procedure includes inputting an image 202 and compute edge weights 203, according to (for example)

$$w_i = \exp(-\beta(I_j - I_k)^2) \text{ for } \{v_j, v_k\} \in e_i, \qquad (29)$$

where $I_j$ indicates the image (volume) intensity at voxel $v_j$.

The normalized Laplacian, $\tilde{L}$ of (6) is built 204.

The K eigenvectors of $\tilde{L}$, Q are computed 205. Q is the matrix of eigenvectors in which each column corresponds to an eigenvector.

Efficient computation of the eigenvectors of $\tilde{L}$ has been well-studied in the Normalized Cuts literature.

Referring to FIG. 2C, given new seeds, the "online" procedure includes using the precomputed Q, generate a K-estimate of P in (22) using the K-estimated $R^T$ of (28) 206. Solve (23) and (24) with the K-estimated P 207. Solve (26) for α 208. Generate $\bar{x}_U$ from (27) 209. Generate x from (15) 210. Threshold x to produce the partition with the best Normalized Cuts value 211.

The most computationally intense step in the "online" procedure is the solution of (23) and (24). However, if the number of seeds is constant, this step requires constant time (for a given image resolution). Solving a full (i.e., non-sparse) set of equations for a matrix obtained from 500 seeds (i.e., having size 500×500) via LU decomposition requires roughly 0.07 s in MATLAB on an Intel Xeon CPU with a 2.4 GHz processor and 3 GB of RAM. Note that any seeds for which all of the neighboring nodes are also seeds need not be used in (23) and (24), since the corresponding $f_S$ entries are zero. Therefore, for a constant number of seeds and eigenvectors, the online procedure has a complexity that is linear in the number of nodes.

Comparing the results of the estimated (via precomputation) segmentation described by this invention to the segmentation obtained from the standard Random Walker image segmentation algorithm. The computation time required to produce the estimated segmentation (after precomputation), given user-placed seeds was extremely fast compared to the exact Random Walker solution.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 3:
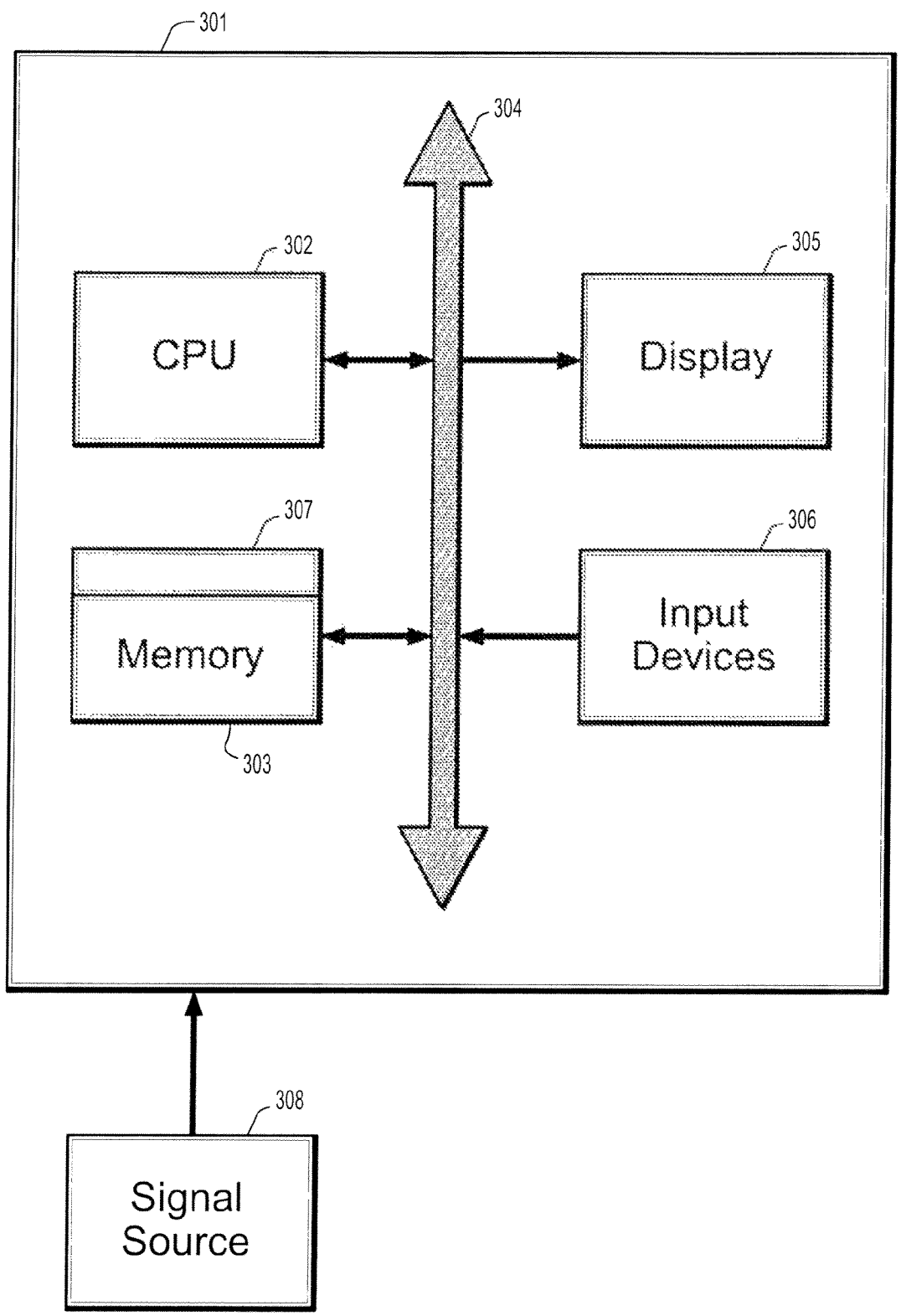
FIG. 3 is a diagram of a system according to an embodiment of the present disclosure.

Referring to FIG. 3, according to an embodiment of the present invention, a computer system 301 for interactive image segmentation given precomputed eigenvectors and user-placed seeds to distinguish a foreground and background region comprise, inter alia, a central processing unit (CPU) 302, a memory 303 and an input/output (I/O) interface 304. The computer system 301 is generally coupled through the I/O interface 304 to a display 205 and various input devices 206 such as a mouse and keyboard. The support circuits can include circuits such as cache, power supplies, clock circuits, and a communications bus. The memory 303 can include random access memory (RAM), read only memory (ROM), disk drive, tape drive, etc., or a combination thereof. The present invention can be implemented as a routine 307 that is stored in memory 303 and executed by the CPU 302 to process a signal, e.g., a closed surface mesh, from the signal source 308. As such, the computer system 301 is a general purpose computer system that becomes a specific purpose computer system when executing the routine 307 of the present invention.

The computer platform 301 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for interactive image segmentation given precomputed eigenvectors and user-placed seeds to distinguish a foreground and background region, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A non-transitory computer readable medium embodying instructions executable by a processor to perform a method for interactive image segmentation, the method comprising:
   receiving an image;
   determining a plurality of generalized eigenvectors of the image without using seed points;
   receiving a seed point for each of at least two portions of the image; and
   determining a partition of the image, the determination of the partition comprising:
   establishing a potential function assigning a label to each of a plurality of nodes of the image according to distances between the nodes and the seed points in a space defined by the generalized eigenvectors, wherein each of the labels correspond to one of the portions of the image; and
   thresholding the potential function to produce the partition of the image.

2. The method of claim 1, wherein the partition of the image corresponds to an object captured by the image.

3. A non-transitory computer readable medium embodying instructions executable by a processor to perform a method for interactive image segmentation, the method comprising:
   receiving an image to be segmented;
   performing an offline computation of eigenvectors of a Laplacian of the image without using seed points;
   receiving seed points; and
   performing an online segmentation taking the seed points and the eigenvectors of the Laplacian as input and outputting a partition of the image,
   wherein performing the online segmentation comprises:
   determining a Normalized Cuts value based on the seed points and the eigenvectors of the Laplacian; and
   partitioning the image according to the Normalized Cuts value.

4. The method of claim 3, wherein performing the offline segmentation further comprises:
   determining edge weights of the image;
   building a normalized Laplacian; and
   determining the eigenvectors of the normalized Laplacian.

5. The method of claim 3, wherein a number of the eigenvectors computed is user selected.

* * * * *